United States Patent
Wang

[11] Patent Number: 5,878,869
[45] Date of Patent: Mar. 9, 1999

[54] ROLLER CONVEYER

[76] Inventor: Shing-Wong Wang, No. 1, Lane 273, Hsin-Ming Rd., Na Fu District, Taipei, Taiwan

[21] Appl. No.: 895,300
[22] Filed: Jul. 16, 1997
[51] Int. Cl.[6] .................................................. B65G 13/073
[52] U.S. Cl. ................ 198/790; 198/781.02; 198/781.03
[58] Field of Search .............................. 198/790, 781.02, 198/781.03; 193/37

[56] References Cited

U.S. PATENT DOCUMENTS

| | | | |
|---|---|---|---|
| 4,864,704 | 9/1989 | Hogan et al. | 193/37 |
| 4,969,548 | 11/1990 | Kornylak | 193/37 |
| 4,993,541 | 2/1991 | Roh | 198/790 |
| 5,392,899 | 2/1995 | Wakabayashi | 198/790 |
| 5,657,854 | 8/1997 | Chen et al. | 198/790 |

OTHER PUBLICATIONS

Interoll, "Interroll–Driving–System", p. 1, Aug. 5, 1970.

Primary Examiner—Joseph E. Valenza
Assistant Examiner—Mark Deuble
Attorney, Agent, or Firm—Varndell Legal Group

[57] ABSTRACT

The invention relates to a roller conveyer that includes a power rack, a motor drive mounted in the power rack, and two track and roller units bilaterally mounted on the power rack. The track and roller unit includes a track, spaced roller assemblies mounted on the track, and a chain driven by the motor drive to turn the roller assemblies for carrying things forward thereon. The roller assembly includes two symmetrical hollow holder frames, two axle bearings respectively mounted in the axial holes of the hollow holder frames, an axle supported by the axle bearings and freely rotatable relative to the hollow holder frames. A bushing with a collar and a chain wheel is sleeved onto the axle, and the chain wheel meshes with the chain. A roller mounted around the bushing and turning with the bushing to carry things forward thereon.

10 Claims, 5 Drawing Sheets

ROLLER CONVEYER

BACKGROUND AND SUMMARY OF THE INVENTION

The Present invention relates to conveyers, and more particularly to an improved structure of roller conveyer which produce low noise during its operation.

FIG. 1 shows a roller conveyer according to the Prior art which comprises a power rack, two track and roller units bilaterally mounted on the power rack at its top side and driven to carry things forwards. Each track and roller unit comprises a conveying chain, and a plurality of rollers revolvably supported between links of the chain. This structure of roller conveyer has drawbacks. Because the rollers are revolvably supported between links of the chain, the chain directly bears the pressure of the load, and high noise will be produced during the operation of the roller conveyer. Because the rollers must be exposed to the outside for carrying the load, dust and small objects may fall to the inside of the track and roller units, causing the chains to be stuck. Furthermore, this design does not allow the user to change the pitch between the rollers.

The present invention has been accomplished to provide a roller conveyer which eliminates the aforesaid drawbacks. According to one aspect of the present invention, the roller conveyer comprises a power rack, a motor drive mounted in said power rack, two track and roller units bilaterally mounted on the power rack, each track and roller unit including a track, a longitudinal row of equally spaced roller assemblies mounted on the track, and a chain driven by the motor drive to turn the roller assemblies in carrying things forwards, wherein each roller assembly includes two symmetrical hollow holder frames transversely fastened to the track by screws and nuts and having a respective axle hole, two axle bearings respectively mounted in the axial holes of the hollow holder frames, an axle revolvably supported on the axle bearings between the hollow holder frames, a bushing sleeved onto the axle and stopped at one side of one axle bearing and having a collar raised around the periphery and a chain wheel fixedly mounted thereon around its periphery and meshed with the chain, an annular locating member mounted around the axle and stopped outside one hollow holder frame and having an outward flange raised around the periphery, a roller mounted around the bushing and having two opposite sides stopped between the collar of the bushing and the outward flange of the annular locating member and turned with the bushing to carrying things forwards, and a spring mounted between the roller and the annular locating member and spaced around the bushing. According to another aspect of the present invention, a dust cover is covered on each track, having a longitudinal row of openings corresponding to the rollers of the roller assemblies of the corresponding track and roller unit. According to still another aspect of the present invention, the axle bearings, the bushing and the annular locating member are made from rigid material for example engineering plastic or metal; the roller is comprised of a roller body made from rigid material, and a roller shell made from flexible material and covered around the roller body. Because the chain does not directly bear the pressure of the load, less noise is produced during the operation of the roller conveyer. Because the roller assemblies are respectively fastened to the respective tracks by screws and nuts, they can be detached from the tracks and then re-installed subject to the desired pitch.

DETAILED DESCRIPTION OF THE PREFERRED EMBODIMENT

Figure 5:
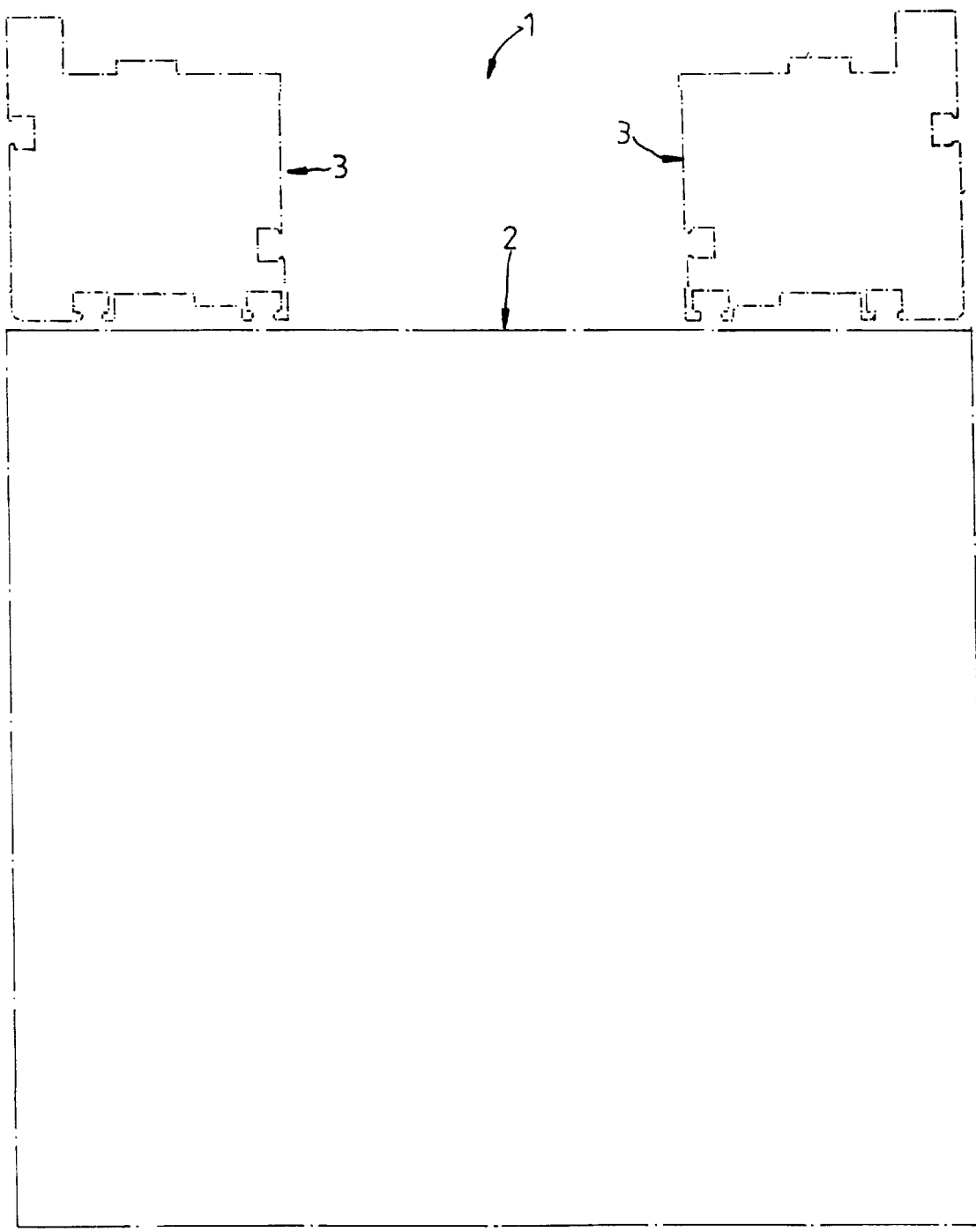
FIG. 5 is a sectional plain view showing two roller and track units bilaterally mounted on a power rack at its top side according to the present invention.

Referring to FIG. 5, a roller conveyer 1 in accordance with the present invention comprises a power rack 2, and two track and roller units 3 bilaterally mounted on the power rack 2 at its top side. The power rack 2 holds a motor drive (not shown), a reduction gear (not shown), and a transmission mechanism (not shown) coupled to the motor drive through the reduction gear and driven to turn the track and roller units 3 in conveying things.

Figure 1:
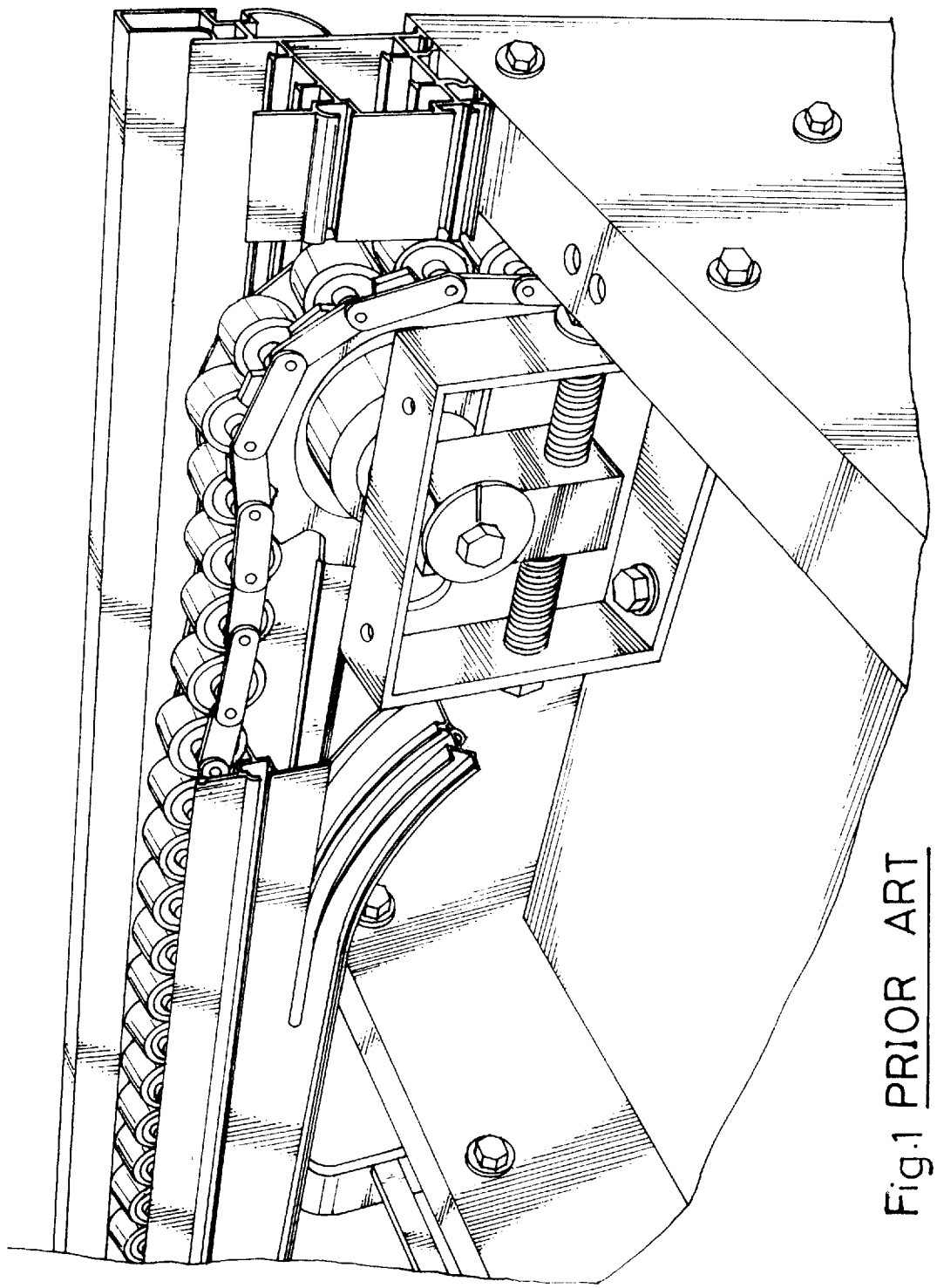
FIG. 1 is a perspective view of a part of a roller conveyer according to the prior art.
Figure 2:
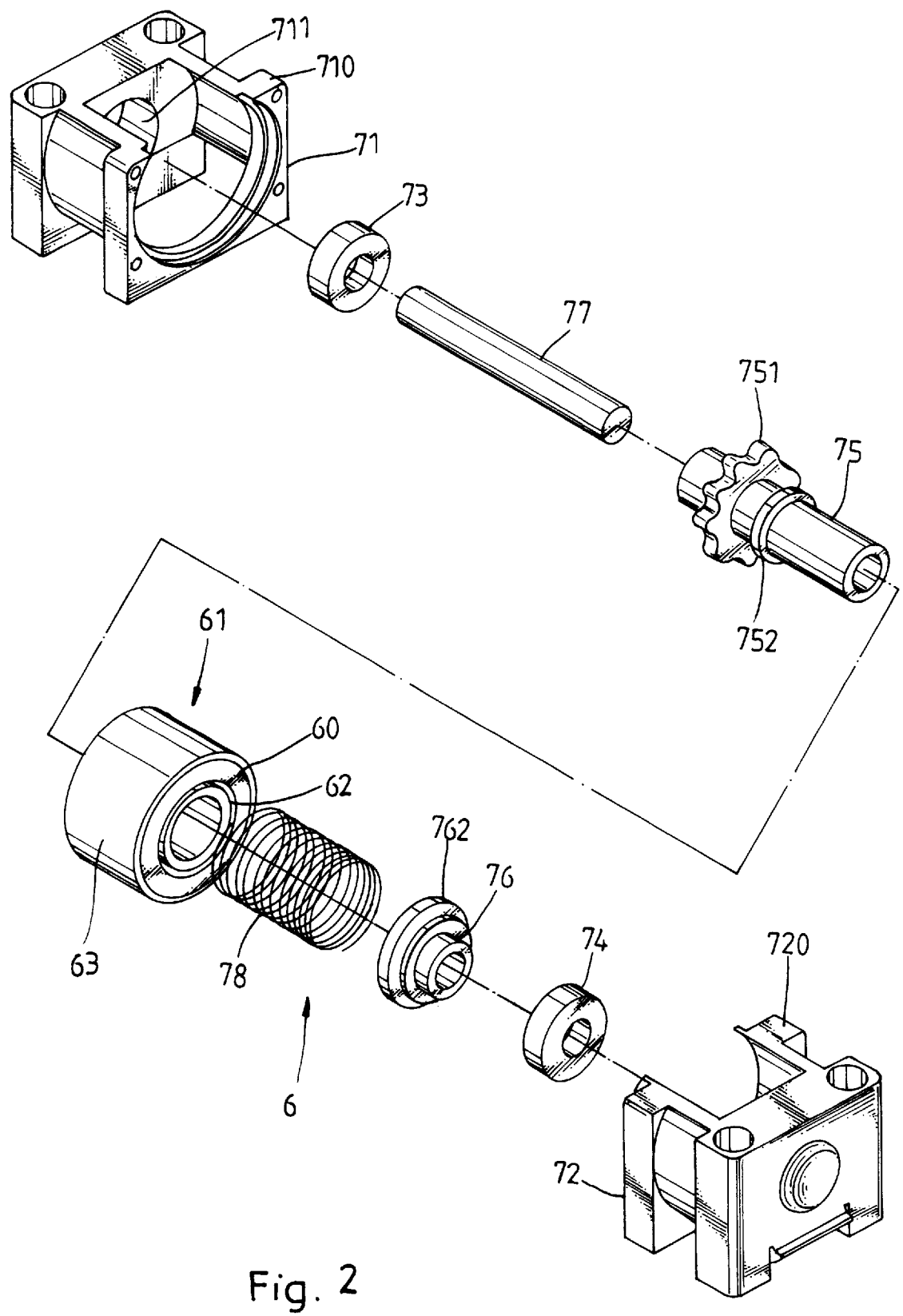
FIG. 2 is an exploded view of a roller assembly according to the present invention.
Figure 3:
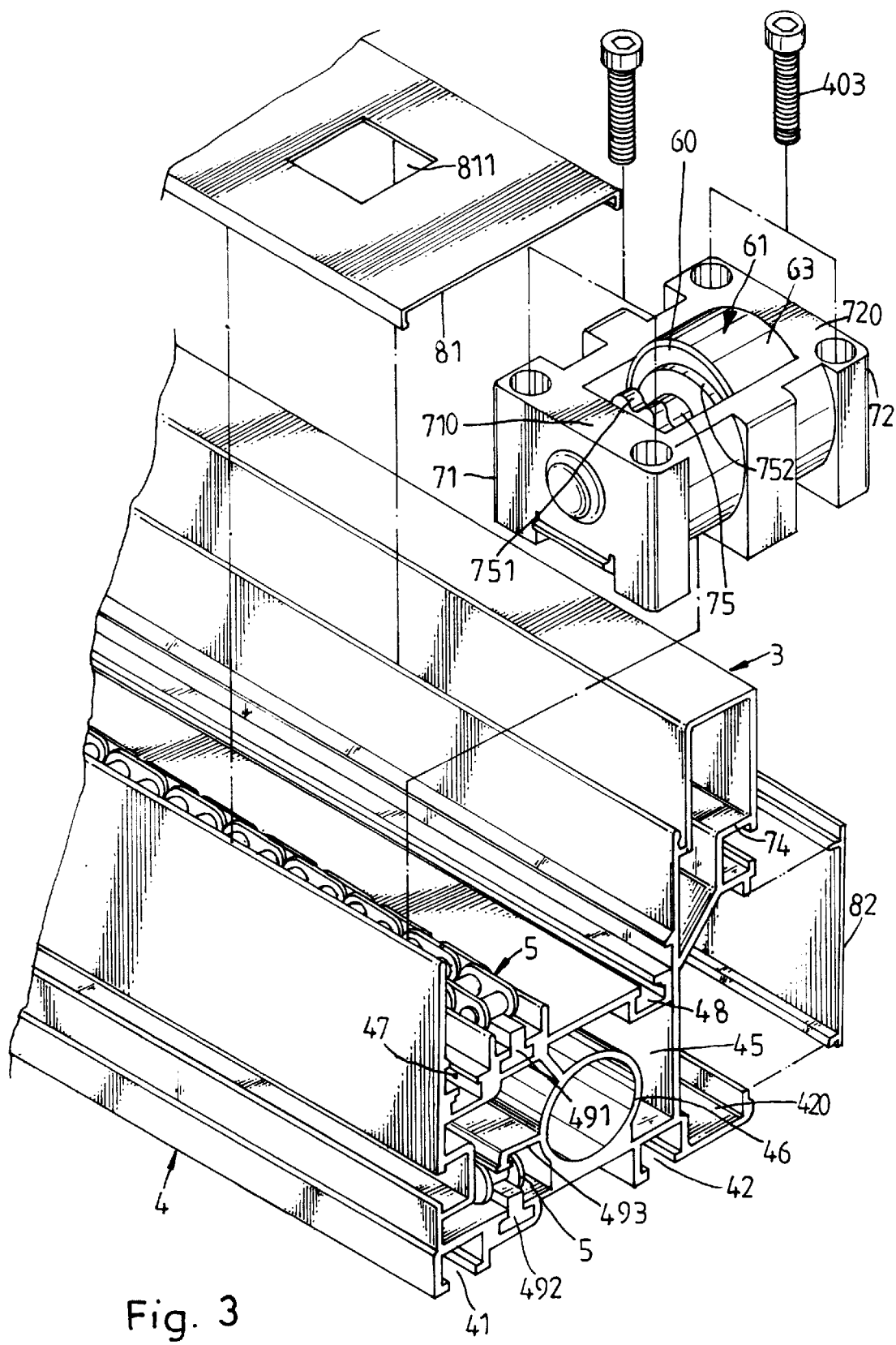
FIG. 3 is an exploded view of a part of a roller conveyer according to the present invention.
Figure 4:
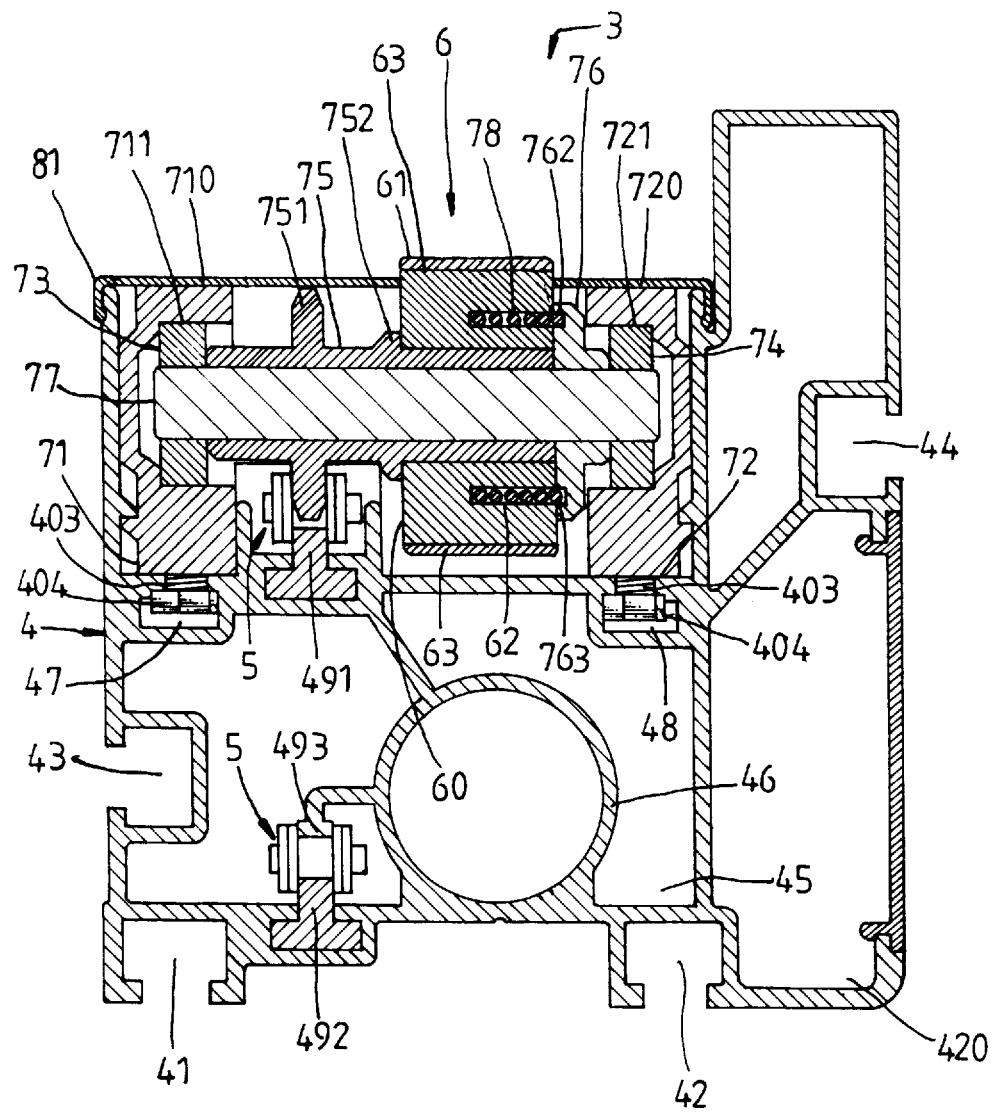
FIG. 4 is a cross sectional view of one roller and track unit according to the present invention.

Referring to FIGS. 2, 3, and 4, the track and roller unit 3 comprises a track 4 extruded from aluminum alloy, a chain 5, and a longitudinal series of equally spaced roller assemblies 6. The track 4 comprises two longitudinal bottom mounting channels 41; 42 fastened to respective longitudinal mounting rails (not shown) of the power rack 2, two longitudinal side mounting grooves 43; 44 at its two opposite vertical side walls adapted for fastening to support means, a longitudinal cable hole 45 for receiving cables, a longitudinal air duct 46, two longitudinal top locating grooves 47; 48 adapted for holding the roller assemblies 6, and two chain racks 491; 492 symmetrically disposed on the inside at different elevations and meshed with the chain 5.

Referring to Figures from 2 to 4 again, the roller assembly 6 comprises a first hollow holder frame 71 and a second hollow holder frame 72 transversely fastened to the longitudinal top locating grooves 47; 48 of the track 4 by screws 403 and nuts 404, a first axle bearing 73 mounted in a axial hole 711 of the first hollow holder frame 71, a second axle bearing 74 mounted in an axial hole 721 of the second hollow holder frame 72, an alxe 77 revolvably supported on the first axle bearing 73 and the second axle bearing 74 between the first hollow holder frame 71 and the second hollow holder frame 72, a bushing 75 sleeved onto the axle 77 and stopped at the first axle bearing 73 and having a collar 752 raised around the periphery and a chain wheel 751 fixedly mounted thereon around its periphery and meshed with the chain 5, an annular locating memeber 76 mounted around the axle 77 and stopped outside the second hollow holder frame 72 and having an outward flange 762 raised around the periphery and an annular groove 763 at one side, a roller 61 mounted around the bushing 75 and having two opposite sides stopped between the collar 752 of the bushing 75 and the outward flange 762 of the annular locating member 76 and an annular groove 62 at one side, and a spring 78 having one end inserted into the annular groove 62 of the roller 61 and an opposite end inserted into the annular groove 763 of the annular locating member 76. When assemblied, the periphery of the roller 61 projects over the topmost edges 710; 720 of the hollow holder frames 71; 72. When the chain 5 is turned, the roller 61 is turned with the bushing 75 to carry the load forward. The roller 61 is turned with the bushing 75 to carry the load forward. The roller 61 is comprised of a roller body 60 made from rigid material such as engineering plastic, rigid plastic, or metal, and a roller shell 63 made from rubber or flexible plastic and covered around the roller body 60. Because the roller shell 63 is made from flexible material and supported on the rigid roller body 60, less noise is produced during the operation of the roller conveyer.

Referring to FIGS. 2 and 4, again, a top dust cover 81 is covered on the track 4, having a longitudinal row of openings 811 corresponding to the rollers 61 of the roller assemblies 6; a side dust cover 82 is covered on one side 420 of the track 4. The aforesaid bearings 73; 74 can be ball bearings respectively made from engineering plastic or resin. The bushing 75 and the annular locating member 76 can be made from engineering plastic, resin, or metal.

I claim:

1. A roller conveyer comprising a power rack, a motor drive mounted in said power rack, and two track and roller units bilaterally mounted on said power rack, said track and roller units comprising a track, a longitudinal row of equally spaced roller assemblies mounted on said track, and a chain driven by said motor drive to turn said roller assemblies for carrying things forward thereon, said roller assemblies comprising a first hollow holder frame and a second hollow holder frame transversely secured to said track, said first and second hollow frames having an axle hole respectively receiving first and second ends of an axle, a first axle bearing mounted in said axial hole of said first hollow holder frame for supporting said first end of said axle and permitting free rotation of said axle relative to said first hollow holder frame, a second axle bearing mounted in said axial hole of said second hollow holder frame for supporting said second end of said axle and permitting free rotation of said axle relative to said second hollow holder frame, a bushing sleeved onto said axle and abutting said first axle bearing; said bushing having a periphery, a collar around said periphery and a chain wheel fixedly mounted around said periphery and meshed with said chain; an annular locating member mounted around said axle and abutting said second hollow holder frame, said annular locating member having an outward flange extending in a radial direction, and a roller mounted around said bushing and having two opposite sides abutting said collar of said bushing and said outward flange of said annular locating member and turned with said bushing to carrying things forward thereon.

2. The roller conveyer of claim 1, wherein said track includes a chain rack means meshed with said chain for guiding movement of said chain.

3. The roller conveyer of claim 1, wherein said track has an open top side covered with a dust cover, said dust cover having a longitudinal row of openings through which said rollers of said roller assemblies project.

4. The roller conveyer of claim 1, wherein said first and second axle bearings, said bushing and said annular locating member are made from engineering plastic.

5. The roller conveyer of claim 1, wherein said bushing and said annular locating member are made from metal.

6. The roller conveyer of claim 1, wherein said track has an outer side covered with a dust cover.

7. The roller conveyer of claim 1, wherein said roller and said annular locating member have a respective annular groove at an inner side thereof, and a spring is mounted between said roller and said annular locating member, said spring having two opposite ends respectively inserted into said annular groove of said roller and said annular groove of said annular locating member.

8. The roller conveyer of claim 1, wherein said roller is comprised of a roller body made from rigid material, and a roller shell made from flexible material covering said roller body.

9. The roller conveyer of claim 1, wherein said roller assembly is held within said track by said first and second hollow holder frames fitting within and abutting said track.

10. The roller conveyer of claim 9, wherein said first and second hollow holder frames are secured to said track by a screw and nut arranged transversely to said axle.

* * * * *